United States Patent

Koslowski

[11] 4,071,453
[45] Jan. 31, 1978

[54] DIAPHRAGM FILTRATION SYSTEM

[75] Inventor: Günter Koslowski, Kirchhellen, Germany

[73] Assignee: Fried. Krupp Gesellschaft mit beschrankter Haftung, Essen, Germany

[21] Appl. No.: 730,522

[22] Filed: Oct. 7, 1976

[30] Foreign Application Priority Data

Oct. 11, 1975 Germany .............................. 2545716

[51] Int. Cl.² .............................................. B01D 13/00
[52] U.S. Cl. .................... 210/232; 210/321 R; 210/433 M; 210/450; 210/497.1
[58] Field of Search ................ 210/232, 321 R, 497.1, 210/433, 450, 500 M

[56] References Cited

U.S. PATENT DOCUMENTS

| 3,579,400 | 5/1971 | Kanyok et al. | 210/321 R |
| 3,715,036 | 2/1973 | Hamer | 210/497.1 |

FOREIGN PATENT DOCUMENTS

| 548,246 | 11/1957 | Canada | 210/321 |
| 2,149,360 | 4/1973 | Germany | 210/500 M |

Primary Examiner—Frank A. Spear, Jr.
Assistant Examiner—Richard W. Burks
Attorney, Agent, or Firm—Spencer & Kaye

[57] ABSTRACT

A diaphragm filtration system includes a pipe and a filtering diaphragm supported substantially coaxially within the pipe and lying, at least indirectly, tightly against the inner pipe wall as filtration proceeds in a radially outward direction. The diaphragm is a sheet member bent cylindrically and having overlapping surfaces; the cross section of the diaphragm is an annulus having a non-continuous area and overlapping ends.

3 Claims, 3 Drawing Figures

DIAPHRAGM FILTRATION SYSTEM

BACKGROUND OF THE INVENTION

This invention relates to a diaphragm filtration system which comprises a plurality of parallel-arranged pipes having terminal enlargements; a plurality of return bends, each interconnecting adjoining ends of two adjacent pipes. In each pipe, there is disposed a diaphragm (arranged substantially coaxially with the pipe) which is supported by sleeves arranged at the pipe ends and which either engages directly face-to-face the inner wall of the associated pipe or is separated therefrom by a support layer which may be fixedly attached to the diaphragm. Adjoining two pipes are secured, at their terminal enlargement, to a base plate of the associated return bend; in the zone of connection between pipe and base plate, there is provided, either in the thickened pipe end or in the base plate, a recess for receiving a sealing element.

A diaphragm filtration system of the above-outlined structure is disclosed in U.S. patent application Ser. No. 703,846 (Grabow et al), filed July 9, 1976. According to the disclosure in that application, the diaphragms are of hose-like structure, that is, the cross section of the diaphragm is an annulus of integral (continuous) area. Similarly structured, known diaphragm filtration systems have since exclusively been equipped with hose diaphragms although the difficulties and disadvantages involved in their use have been well known.

It is thus a disadvantage of hose-shaped diaphragms that their manufacture with small diametrical tolerances has encountered technical difficulties and has generated high manufacturing costs. Further, the pipes of the diaphragm filtration system have, regarding their inner diameter, and the support layers have, regarding their thicknesses, tolerances of such a range that the hose diaphragms which are arranged in the pipes or, as the case may be, on the support layers, are often damaged by fold formation or excessive expansion. Further, because of the expensive manufacture, diaphragm hoses are available only in limited predetermined diameters and, consequently, the design engineer is compelled to adapt the structural data of the diaphragm filtration system to the given diameter of the hose diaphragm. In this manner, many, technically advantageous solutions had to remain unexploited. Also, the different hose diaphragm types can be shipped and stored only in expensive water containers.

SUMMARY OF THE INVENTION

It is an object of the invention to provide an improved diaphragm filtration system which is equipped with diaphragms that may have different dimensions with greater dimensional tolerances, which may be manufactured economically, which may be assembled in a simple manner and which, in continued operation, have only a very slight defect incidence.

The above objects and others to become apparent as the specification progresses, are accomplished by the invention, according to which, briefly stated, the diaphragm is an overlapping, cylindrically bent flat sheet member which, during the filtration process, lies, directly or with the interposition of a support layer, tightly against the inner wall of the associated pipe. Thus, the cross section of the assembled diaphragm is an annulus having a non-continuous area and overlapping ends.

It has been unexpectedly discovered that the hose diaphragms used heretofore in diaphragm filtration systems can be, according to the invention, replaced by diaphragms of initially flat, sheet-like structure. Particularly in diaphragms which are fixedly connected with a thicker support layer, it is, according to the invention, particularly advantageous to provide that the surfaces which are in contact with the sealing elements as well as the diaphragm surfaces which are in an overlapping relationship with one another, are liquid impervious. The overlapping diaphragm faces are rendered liquid impervious, for example, by immersing the diaphragm into a liquid synthetic material or by means of heat treatment to thus "seal" these diaphragm areas. The diaphragm surfaces which are in overlapping relationship with one another when installed in the pipes of the filtration system should be made liquid impervious during manufacture of the diaphragms. The edges of polyamide and polyimide diaphragms are rendered non-porous and thus liquid impervious by treating them with hot air. The edges of cellulose acetate diaphragms are rendered liquid impervious by coating them with an adhesive manufactured by the German firm of Kalle AG.

It is an advantage of the invention that the manufacturing and assembly costs of the flat diaphragms are significantly lower than for diaphragms having a hose structure. In particular, the use of complex machines required for the manufacture of the hose diaphragms may be dispensed with. The quality of the filtrate is not adversely affected by the diaphragm filtration system designed according to the invention.

BRIEF DESCRIPTION OF THE DRAWINGS

FIG. 1b is a sectional view along line 1b — 1b of FIG. 1a.

DESCRIPTION OF THE PREFERRED EMBODIMENT

Figure 1A:
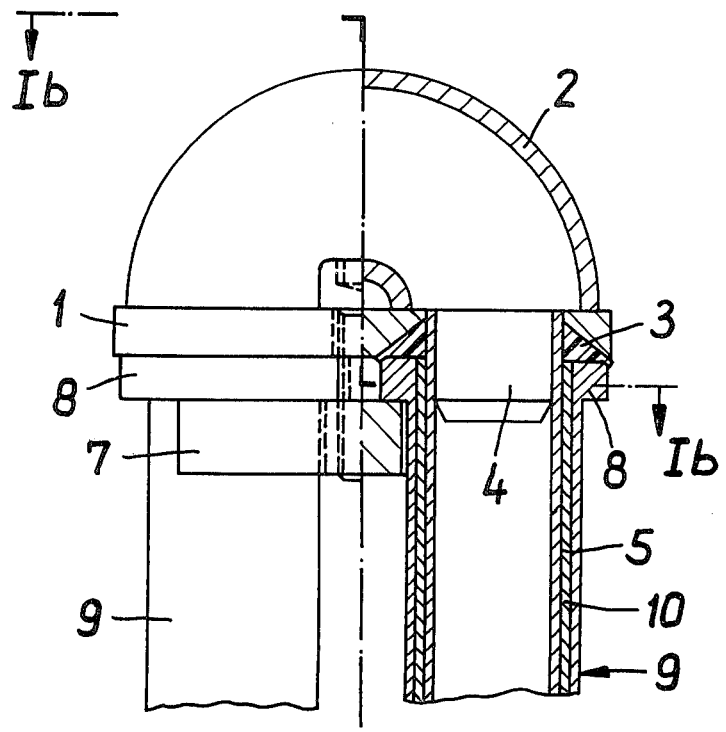
FIG. 1a is an elevational sectional view of a preferred embodiment of the invention.
Figure 1B:
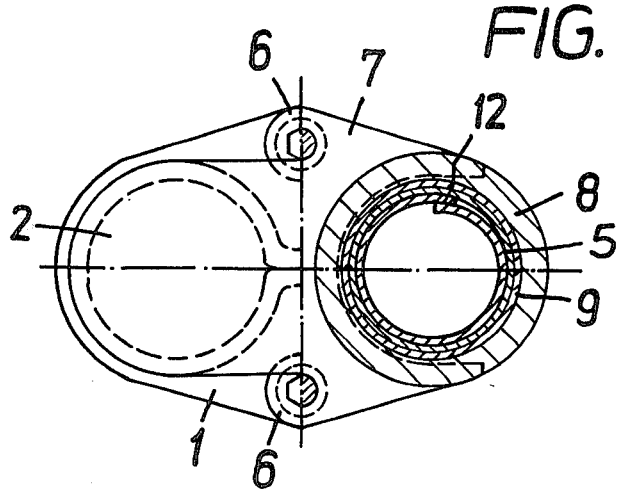
Figure 2:
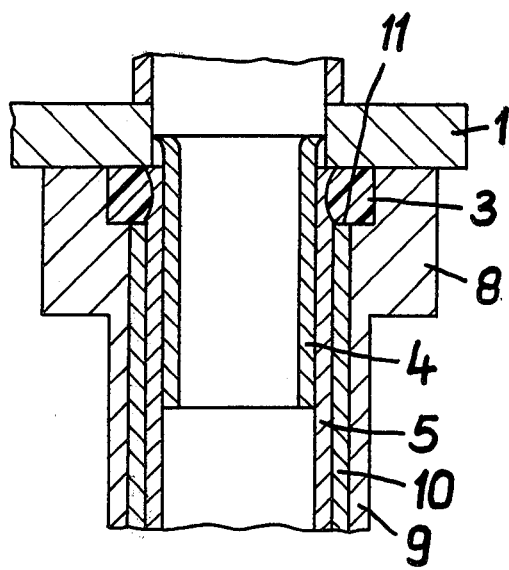
FIG. 2 is an elevational sectional view taken across a sealing zone of the same embodiment.

The diaphragm filtration system illustrated in the figures is utilized in a known manner for the separation of solutions, particularly of the aqueous type. The system comprises a number of parallel-arranged pipes 9 which have flange-like terminal enlargements 8 provided on the pipes 9 by gluing, welding or soldering. Each pipe has lateral bores (not shown) for discharging the filtrate. Adjoining two pipes 9 are in communication with one another by means of a return bend 2 to provide a parallel or a series connection between the pipes 9 of the filtration system. Each return bend 2 has a flange-like base plate 1 which, depenent upon the properties of the material of the return bend 2, may be cast with the return bend or welded or glued thereto. Any two adjoining pipes and the associated return bend 2 may be coupled to one another by means of two bolts 6 which pass through corresponding bores in the base plate 1 and which extend into an open brace 7, as illustrated in FIG. 1. It is to be understood that other types of connecting arrangements between return bend and pipes are also feasible.

According to the invention, in each pipe 9, there is provided an overlapping, cylindrically bent flat diaphragm 5 which either engages directly face-to-face the inner wall of the associated pipe 9 or is carried by a support layer 10 which, in turn, is in engagement with the inner wall of the pipe 9. The slurry or solution to be filtered flows in the pipes 9 and is forced radially outwardly through the filtering diaphragms 5. The support layer 10 is either fixedly connected with the flat diaphragms 5 or is formed as a hose or as a hose-shaped strip (in which case, it has to be mounted as a separate component). The support layer 10 may be formed of sintered metal (separate support tube), sintered synthetic material, paper or other similar porous and liquid pervious material.

The overlapping surfaces 12 and the other parts of the flat diaphragm 5 are, during the filtration process, firmly pressed against the inner wall of the tube 9 or, as the case may be, against the support layer 10. The cylindrically bent flat diaphragm 5 is supported at each end by a sleeve 4 provided in the end zones of each pipe 9.

In case the flat diaphragm 5 is fixedly connected to the support layer 10 to thus form therewith a composite body, the latter projects beyond the flange-like pipe enlargement 8. In case the flat diaphragm 5 and the support layer 10 are formed as separate components, a radial face of the enlargement 8 and the upper radial edge face 11 of the support layer 10 lie in the same plane and it is thus only the flat diaphragm 5 which projects beyond the pipe end 8 (see FIG. 1a). In the base plate 1 or in the thickened pipe end 8 in each zone of connection, there is provided a recess of spherical or cylindrical shape for receiving a sealing element 3. The sealing element may be made of rubber or a material of proper sealing properties. As the two pipes 9 are tightened to the base plate 1 of the return bend 2, each sealing element 3 is pressed in a radial direction against the end of the flat diaphragm 5 or, as the case may be, against the end of the composite body formed of the flat diaphragm 5 and the support layer 10 and in an axial direction against the radial surface 11 of the support layer 10. Further, the pipe end 8 and the return bend 2 are sealed by the sealing element 3 with respect to the external environment.

In order to prevent contamination of the filtrate by the concentrate, the overlapping surfaces 12 and the surfaces of the flat diaphragm 5 that are in contact with the sealing elements 3 are expediently liquid impervious. Such a property is obtained, for example, by immersing selected portions of the diaphragm 5 into a liquid synthetic material or by heat treatment. This "sealing" of selected areas can also be effected in some composite bodies (that is, a flat diaphragm 5 with an associated support layer 10 affixed thereto) are used.

For performing the assembling operation, first the support layer 10 — if it is a component separate from the diaphragm 5 — is pushed into the associated pipe 9. Thereafter, the flat diaphragm 5 is bent cylindrically and pushed into the pipe 9. Subsequently, the sleeve 4 is inserted into the pipe 9, whereby the terminus of the flat diaphragm 5 is brought into the final, permanent position in which the surfaces 12 overlap. Subsequent to the tightening of the pipes 9 with the return bends 2, the solution or slurry to be separated is introduced into the filtration system and the operating pressure is built up. During this step, the entire flat diaphragm 5 is pressed against the inner wall of the pipe 9, with the diaphragm surfaces 12 in an overlapping position. In this connection it is added that, in order to ensure that an overlapping relationship of the marginal zones (surfaces 12) of the diaphragm is maintained throughout the operation of the system, the end-to-end circumference of the diaphragm 5 is greater than the circumference of the inner wall of the pipe 9. During the starting operation of the filtration system (which has a duration of 1 to 5 minutes), the large filtrate quantity leaving the lateral bores of the pipe 9 has not yet reached the required quality and is thus rejected. As soon as the flat diaphragms 5 have assumed their permanent operational position in the pipes 9, the exiting filtrate quantity diminishes and thereafter the filtrate has the required properties for further processing. The filtrate leaving the lateral bores of the pipes 9 is collected in a container (not shown). The diaphragm filtration system designed according to the invention may be operated with a pressure of, for example, up to 200 bars. The magnitude of the pressure is dependent on the composition of the solution to be separated and the properties of the flat diaphragm 5.

The system designed according to the invention may be continuously operated for an extended period of, for example, 6 to 12 months. After this period, the filtration system has to be equipped with new flat diaphragms 5 and/or support layers 10.

It will be understood that the above description of the present invention is susceptible to various modifications, changes and adaptations, and the same are intended to be comprehended within the meaning and range of equivalents of the appended claims.

What is claimed is:

1. In a diaphragm filtration system including a pipe; a filtering diaphragm supported substantially coaxially within the pipe and lying, at least indirectly, tightly against the inner pipe wall as filtration proceeds in a radially outward direction; the improvement wherein said diaphragm is a sheet member bent cylindrically and having liquid impervious, unbonded overlapping surfaces; the cross section of said diaphragm being an annulus having overlapping ends and a non-continuous area and the end-to-end circumference of said diaphragm being greater than the circumference of said inner pipe wall.

2. A diaphragm filtration system as defined in claim 1, further comprising a support layer positioned between said diaphragm and said inner pipe wall.

3. A diaphragm filtration system as defined in claim 1, wherein said diaphragm filtration system includes a plurality of parallel-arranged pipes each containing a separate said diaphragm; a plurality of return bends, each interconnecting adjoining ends of adjacent two pipes; means for joining the pipes to the respective return bends; a flange-like pipe enlargement constituting the terminus of each pipe; a base plate forming part of each return bend and arranged adjacent the adjoining enlargements associated with two adjacent pipes; means defining a recess in the zone of each said enlargement; a sealing element received in the recess, said sealing element surrounding and engaging an end portion of each said diaphragm; and tightening means for clamping the adjoining pipe enlargements to the associated base plate; said end portion of each said diaphragm being liquid impervious.

* * * * *